US012039382B2

(12) United States Patent
Srivastava

(10) Patent No.: US 12,039,382 B2
(45) Date of Patent: Jul. 16, 2024

(54) REAL TIME INTELLIGENT MESSAGE BUS MANAGEMENT TOOL

(71) Applicant: Bank of America Corporation, Charlotte, NC (US)

(72) Inventor: Gaurav Srivastava, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 326 days.

(21) Appl. No.: 17/682,307

(22) Filed: Feb. 28, 2022

(65) Prior Publication Data

US 2023/0273843 A1  Aug. 31, 2023

(51) Int. Cl.
G06F 9/54 (2006.01)
G06F 9/48 (2006.01)
G06F 13/36 (2006.01)

(52) U.S. Cl.
CPC ............ *G06F 9/546* (2013.01); *G06F 9/4831* (2013.01); *G06F 13/36* (2013.01)

(58) Field of Classification Search
None
See application file for complete search history.

(56) References Cited

U.S. PATENT DOCUMENTS

| | | |
|---|---|---|
| 4,961,140 A | 10/1990 | Pechanek et al. |
| 5,253,253 A | 10/1993 | Brame et al. |
| 5,640,573 A | 6/1997 | Gephardt et al. |
| 5,889,968 A | 3/1999 | Bennett et al. |
| 7,926,099 B1 | 4/2011 | Chakravarty et al. |
| 7,979,766 B2 | 7/2011 | Sharma et al. |
| 7,984,449 B2 | 7/2011 | Baran et al. |
| 8,174,405 B2 | 5/2012 | Edwards et al. |
| 8,595,380 B2 | 11/2013 | Megginson |
| 8,856,531 B1 | 10/2014 | Robinson et al. |
| 9,043,478 B2 | 5/2015 | Burns et al. |
| 9,047,155 B2 | 6/2015 | DeHaan |
| 9,535,862 B2 | 1/2017 | Falco et al. |
| 9,559,961 B1 | 1/2017 | Sorenson, III et al. |
| 9,600,131 B2 | 3/2017 | Rodriguez et al. |
| 9,830,672 B2 | 11/2017 | Carlson et al. |
| 10,452,592 B1 | 10/2019 | Narasimha et al. |

(Continued)

FOREIGN PATENT DOCUMENTS

CN            105488216 A  *  4/2016  ......... G06F 16/9535
WO    WO 2018056883 A1  *  3/2018  ............ H04L 67/12

*Primary Examiner* — Charles E Anya
(74) *Attorney, Agent, or Firm* — Banner & Witcoff, Ltd.

(57) ABSTRACT

Aspects of the disclosure relate to message processing. A computing platform may intercept an application message, which may be directed to a message bus. The computing platform may input the application message into a model, which may output a message priority score for the application message. The computing platform may compare, using the model, the message priority score to a message priority threshold. Based on identifying that the message priority score does not exceed the message priority threshold, the computing platform may route the application message to a message storage system rather than the message bus. The computing platform may monitor the message bus to detect available processing capacity. Based on identifying that the available processing capacity meets or exceeds a message processing threshold, route the application message to the message bus.

20 Claims, 11 Drawing Sheets

(56) References Cited

U.S. PATENT DOCUMENTS

| | | |
|---|---|---|
| 10,708,376 B2 | 7/2020 | Seed et al. |
| 10,713,209 B2 | 7/2020 | Jen et al. |
| 10,794,729 B2 | 10/2020 | Edwards et al. |
| 10,810,147 B1 | 10/2020 | Twohig et al. |
| 10,972,342 B2 | 4/2021 | Shenoy et al. |
| 11,146,643 B2 | 10/2021 | Komatsu |
| 2005/0060610 A1* | 3/2005 | Leary ................ G06F 11/3672 714/25 |
| 2019/0306107 A1* | 10/2019 | Galbraith ............... H04L 51/56 |

* cited by examiner

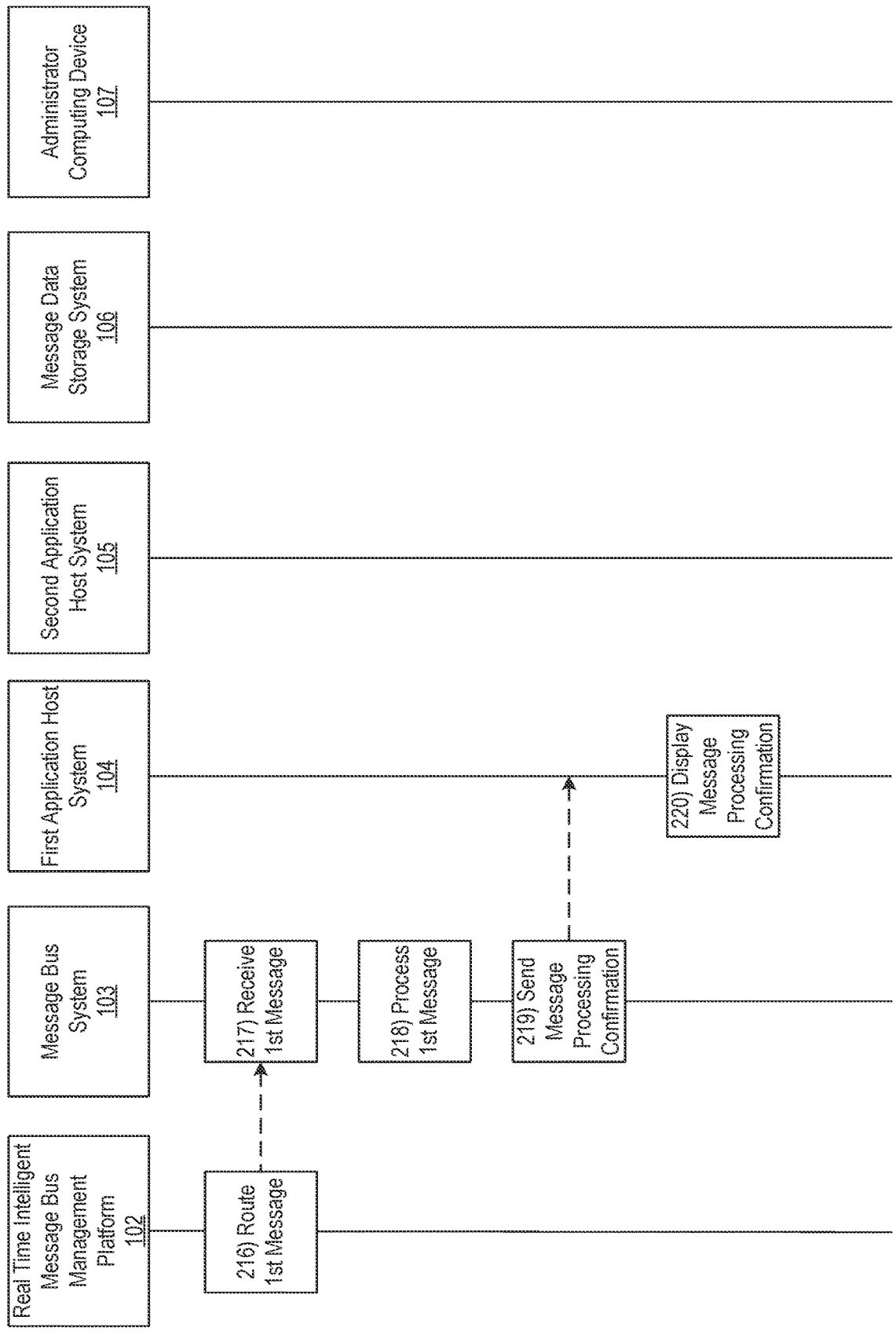

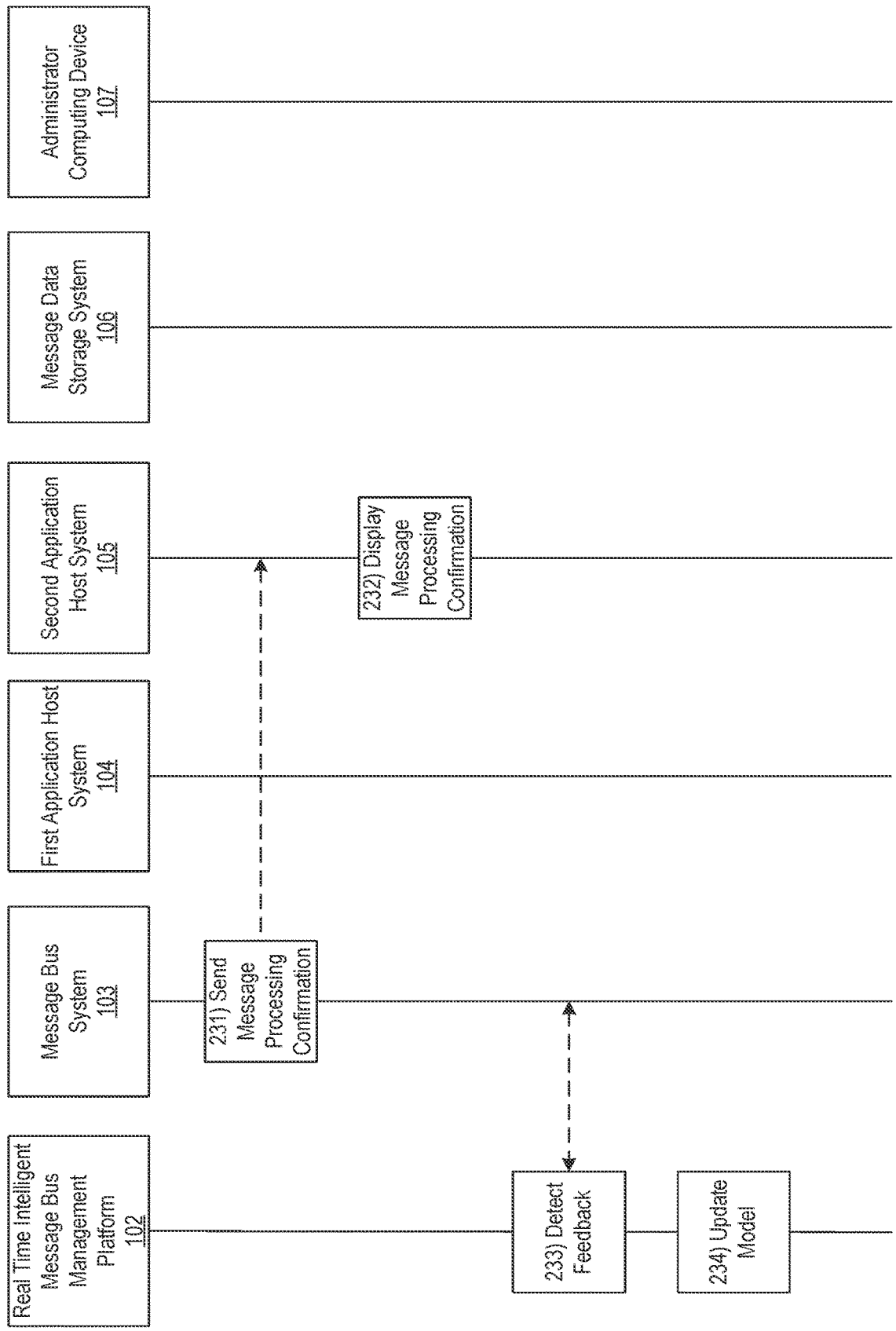

405

Message Processing Confirmation

Your request has been processed.

Message Processing Confirmation

Please note that processing of your request has been delayed, and will be processed shortly. You will receive confirmation once the request has been processed.

FIG. 5

REAL TIME INTELLIGENT MESSAGE BUS MANAGEMENT TOOL

BACKGROUND

Aspects of the disclosure relate to electrical computers and digital processing systems, data transferring, and enhanced processing systems for application message bus management. In particular, one or more aspects of the disclosure relate to computing device management of an application message bus.

Many applications rely on the use of a message bus to process events, messages, and/or other requests from such applications. In some instances, however, the message bus may be limited in size (e.g., constrained by memory of the message bus system). If application messages at the message bus overload its processing capabilities, the messages might not be processed, which may, e.g., cause lack of response, misbehavior, and/or other application errors. Accordingly, it may be important to improve management of such message buses to avoid application errors.

SUMMARY

Aspects of the disclosure provide effective, efficient, scalable, and convenient technical solutions that address and overcome the technical problems associated with message processing. In accordance with one or more embodiments of the disclosure, a computing device comprising at least one processor, a communication interface, and memory storing computer-readable instructions may intercept a first application message from an application host system, where the first application message is directed to a message bus for processing. The computing platform may input the first application message into a real time intelligent message bus management model, which may be configured to output a first message priority score for the first application message. The computing platform may compare, using the real time intelligent message bus management model, the first message priority score to a message priority threshold. Based on identifying that the first message priority score does not exceed the message priority threshold, the computing platform may route the first application message to a message storage system rather than the message bus. The computing platform may monitor the message bus to detect available processing capacity. Based on identifying that the available processing capacity meets or exceeds a message processing threshold, the computing platform may route the first application message to the message bus. The computing platform may monitor the message bus to detect message processing feedback information. The computing platform may update, using the message processing feedback information, the real time intelligent message bus management model.

In one or more instances, the computing platform may train the real time intelligent message bus management model, which may be a decision tree model, using a supervised learning process. In one or more instances, the computing platform may train the real time intelligent message bus management model automatically based on: historical application messages, message priority scores corresponding to the historical application messages, historical processing capacity of the message bus, and/or other information.

In one or more examples, the computing platform may intercept a second application message from the application host system, which may be directed to the message bus for processing. The computing platform may input the second application message into the real time intelligent message bus management model, which may be configured to output a second message priority score for the second application message. The computing platform may compare, using the real time intelligent message bus management model, the first message priority score to the message priority threshold. Based on identifying that the second message priority score meets or exceeds the message priority threshold, the computing platform may route the second application message to the message bus.

In one or more instances, detecting the available processing capacity may include identifying one or more of: throughput, utilization, or redundancy of the message bus. In one or more instances, based on identifying that the available processing capacity does not exceed message processing threshold, the computing platform may delay routing of the first application message to the message bus.

In one or more examples, the computing platform may dynamically identify, using the real time intelligent message bus management model, the message priority threshold. In one or more examples, the message processing feedback information may be one or more of: processing delays at the message bus, throughput at the message bus, utilization at the message bus, redundancy at the message bus, a duration during which application messages are being routed to the message storage system, a rate of changing message flow between the message bus and the message storage system, and/or other information.

In one or more instances, updating the real time intelligent message bus management model may include updating one or more of: the message priority threshold or the message processing threshold. In one or more instances, application messages may include requests to execute a transaction, and the real time intelligent message bus management model may be configured to score the application messages based on one or more of: a transaction value, a transaction quantity, or a transaction party.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for improved message bus management in accordance with one or more example embodiments;

FIGS. 4 and 5 depict example graphical user interfaces for improved message bus management in accordance with one or more example embodiments.

DETAILED DESCRIPTION

Figure 1A:
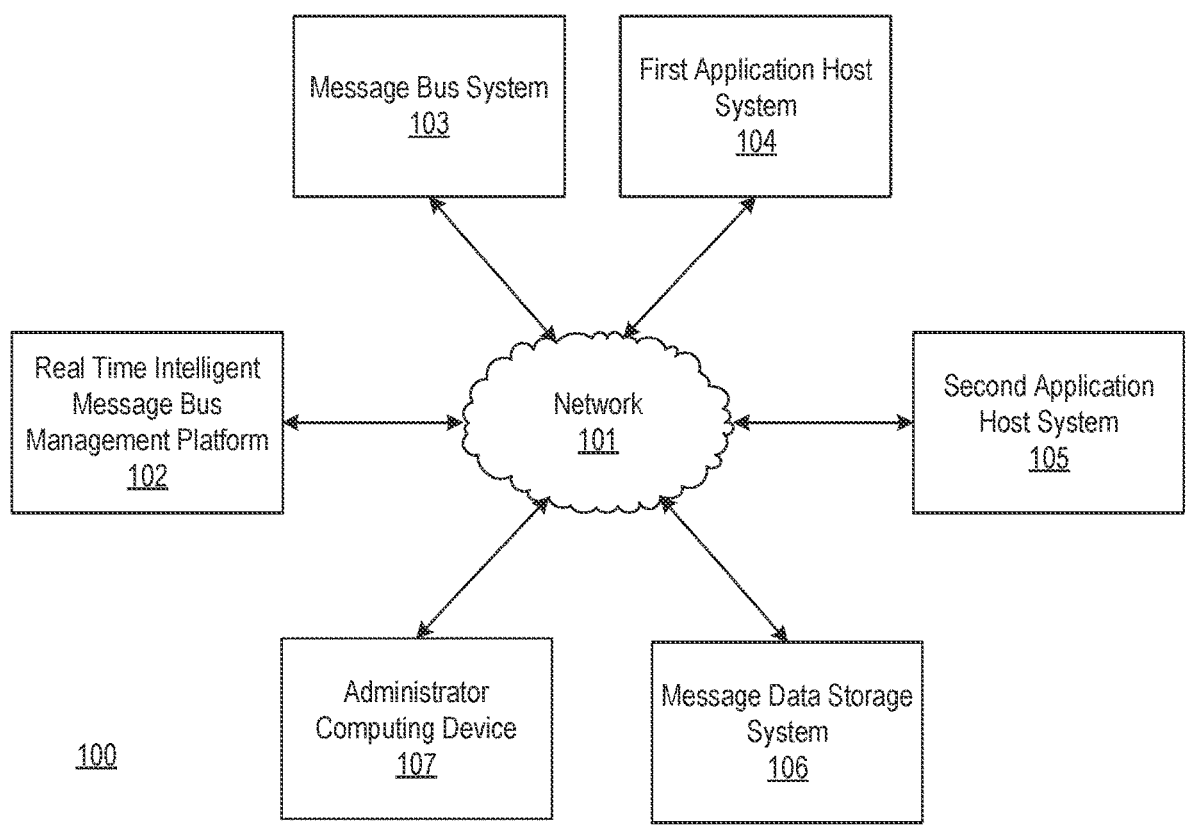
FIGS. 1A and 1B depict an illustrative computing environment for improved message bus management in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to managing application messages for routing to a message bus. For example, applications using a message bus may be constrained by memory of a corresponding machine. For example, the message bus may be of limited size, and might be limited in an amount of data it is capable of storing. In these instances, as the messages in the message bus reach a certain count or the message bus reaches a certain size (in terms of memory), the application may stop responding or misbehave. In some instances, the message bus messages may be manually cleared and/or the message bus may be restarted so that the application may become responsive. This may result in the loss of useful messages from the data and a certain amount of downtime.

Accordingly, described herein is a message bus that may be autodidactic, smart, and auto-managing. This may involve both detecting that a message bus is overloading, and accessing/assessing/processing data in the message bus at runtime without any downtime. Such actions may be performed by a real time intelligent message bus management tool. In some instances, the tool may detect the message bus overload problem using a machine learning model, which may identify when to trigger a data optimization process. Once the problem is detected, the tool may perform data optimization. In some instances, the tool may be used in an auto-cleaning mode and/or a manual mode. For example, the tool may use an automatic approach for its operation. A user may control the message bus optimization process by defining the training data used for the model.

In some instances, the tool may selectively and intelligently purge the data inside the message bus depending on the training data. In some instances, the entire process may be performed in real time, and might not need any application downtime. In some instances, the tool may be autodidactic, smart (e.g., identifies data patterns and expands the decision model), and/or auto-managing (e.g., frees up the message bus by way of moving the lower priority data into a separate storage system and prioritize the data). Accordingly, the tool may manage the data selectively inside the message bus in an automated way.

In doing so, the system might not cause any application downtime, and no manual intervention/associated documentation for live production may be needed. The tool may be used to analyze the data (e.g., throughput, message bus utilization, or the like) and/or process it based upon the training data. The intelligent aspect may work using pattern recognition. It may automatically create decision trees based on the available data (e.g., throughput, message bus utilization, or the like) to determine where to route messages. The message bus may automatically remediate (e.g., move the messages into a separate store system/prioritize) the problems it detects. In some instances, this process may be performed in real time, and online (which might not require any outage or downtime of associated systems).

Figure 1B:
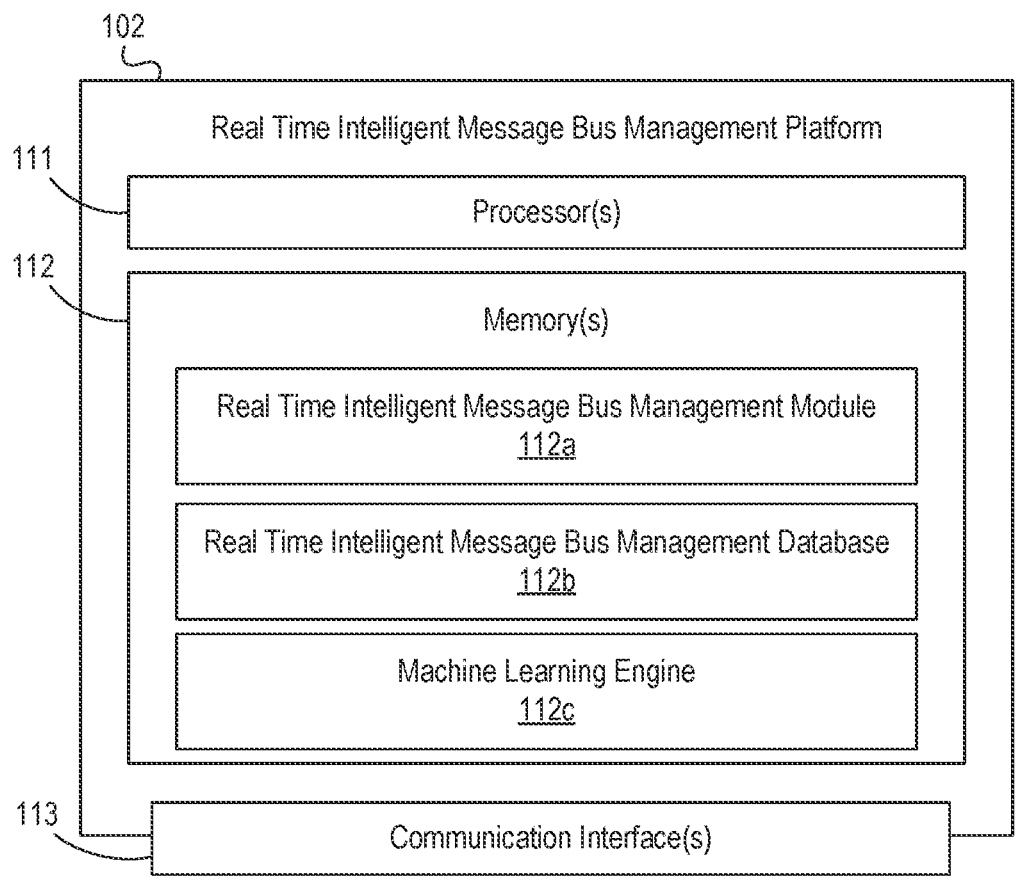

FIGS. 1A-1B depict an illustrative computing environment for improved message bus management in accordance with one or more example embodiments. Referring to FIG. 1A, computing environment 100 may include one or more computer systems. For example, computing environment 100 may include a real time intelligent message bus management platform 102, a message bus system 103, a first application host system 104, a second application host system 105, a message data storage system 106, and an administrator computing device 107.

As illustrated in greater detail below, real time intelligent message bus management platform 102 may include one or more computing devices (e.g., servers, server blades, or the like) and/or other computer components (e.g., processors, memories, communication interfaces). Real time intelligent message bus management platform 102 may be configured to train, host, and/or otherwise maintain a machine learning engine that may score application messages based on their corresponding priority. Real time intelligent message bus management platform 102 may also be configured to dynamically maintain, using the machine learning engine, a message priority threshold, and may be configured to route application messages to one of a message bus (e.g., message bus system 103) or storage (e.g., message data storage system 106) based on comparison of priority scores to the priority threshold. In some instances, the real time intelligent message bus management platform 102 may be an independent system, and in other instances, the real time intelligent message bus management platform 102 may be a layer on top of the message bus system 103.

Message bus system 103 may be a computer system that includes one or more computing devices (e.g., servers, server blades, or the like) and/or other computer components (e.g., processors, memories, communication interfaces). Message bus system 103 may be configured to maintain a queue of application messages for processing, and to process these application messages accordingly. In some instances, the message bus system 103 may receive application messages from one or more applications, process these application messages, and return responses to the one or more applications (e.g., rather than merely being configured for one to one messaging/response).

First application host system 104 may be a computer system that includes one or more computing devices (e.g., servers, server blades, a laptop computer, desktop computer, smartphone, smartwatch, tablet, and/or other device) and/or other computer components (e.g., processors, memories, communication interfaces) that may be used to host applications and send application messages accordingly. In some instances, the first application host system 104 may be configured to display one or more graphical user interfaces.

Second application host system 105 may be a computer system that includes one or more computing devices (e.g., servers, server blades, a laptop computer, desktop computer, smartphone, smartwatch, tablet, and/or other device) and/or other computer components (e.g., processors, memories, communication interfaces) that may be used to host applications and send application messages accordingly. In some instances, the second application host system 105 may be configured to display one or more graphical user interfaces. In some instances, applications hosted by the second application host system 105 may be the same or different than those hosted by the first application host system 104.

Message data storage system 106 may be a computer system that includes one or more computing devices (e.g., servers, server blades, and/or other device) and/or other computer components (e.g., processors, memories, communication interfaces) configured to store application messages for later processing (e.g., based on a request from the real time intelligent message bus management platform 102). For example, the message data storage system 106 may be configured to receive application messages, store the application messages, and provide the application messages to the real time intelligent message bus management platform 102 and/or the message bus system 103 once prompted to do so.

Administrator computing device 107 may be a computer system that includes one or more computing devices (e.g., laptop computer, desktop computer, smartphone, smartwatch, tablet, and/or other device) and/or other computer components (e.g., processors, memories, communication interfaces) that may be used to by an administrator to manually input data and/or rules that may be used to define and/or otherwise train the machine learning model hosted by the real time intelligent message bus management platform 102. In some instances, the administrator computing device 107 may be configured to provide one or more graphical user interfaces.

Computing environment 100 also may include one or more networks, which may interconnect real time intelligent message bus management platform 102, message bus system 103, first application host system 104, second application host system 105, message data storage system 106, and/or administrator computing device 107. For example, computing environment 100 may include a network 101 (which may interconnect, e.g., real time intelligent message bus management platform 102, message bus system 103, first application host system 104, second application host system 105, message data storage system 106, and/or administrator computing device 107).

In one or more arrangements, real time intelligent message bus management platform 102, message bus system 103, first application host system 104, second application host system 105, message data storage system 106, and/or administrator computing device 107 may be any type of computing device capable of receiving a user interface, receiving input via the user interface, and communicating the received input to one or more other computing devices. For example, real time intelligent message bus management platform 102, message bus system 103, first application host system 104, second application host system 105, message data storage system 106, administrator computing device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real time intelligent message bus management platform 102, message bus system 103, first application host system 104, second application host system 105, message data storage system 106, and/or administrator computing device 107 may, in some instances, be special-purpose computing devices configured to perform specific functions.

Referring to FIG. 1B, real time intelligent message bus management platform 102 may include one or more processors 111, memory 112, and communication interface 113. A data bus may interconnect processor 111, memory 112, and communication interface 113. Communication interface 113 may be a network interface configured to support communication between real time intelligent message bus management platform 102 and one or more networks (e.g., network 101, or the like). Memory 112 may include one or more program modules having instructions that when executed by processor 111 cause real time intelligent message bus management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of real time intelligent message bus management platform 102 and/or by different computing devices that may form and/or otherwise make up real time intelligent message bus management platform 102. For example, memory 112 may have, host, store, and/or include a real time intelligent message bus management module 112a, a real time intelligent message bus management database 112b, and a machine learning engine 112c. Real time intelligent message bus management module 112a may have instructions that direct and/or cause real time intelligent message bus management platform 102 to execute advanced message bus management techniques, as discussed in greater detail below. Real time intelligent message bus management database 112b may store information used by real time intelligent message bus management module 112a and/or real time intelligent message bus management platform 102 in executing efficient message bus management techniques and/or in performing other functions. Machine learning engine 112c may store rules and/or models that may be used to perform dynamic and real time message bus management, as described further herein, which may be iteratively refined through a dynamic feedback loop to improve performance of the real time intelligent message bus management platform 102.

Figure 2A:
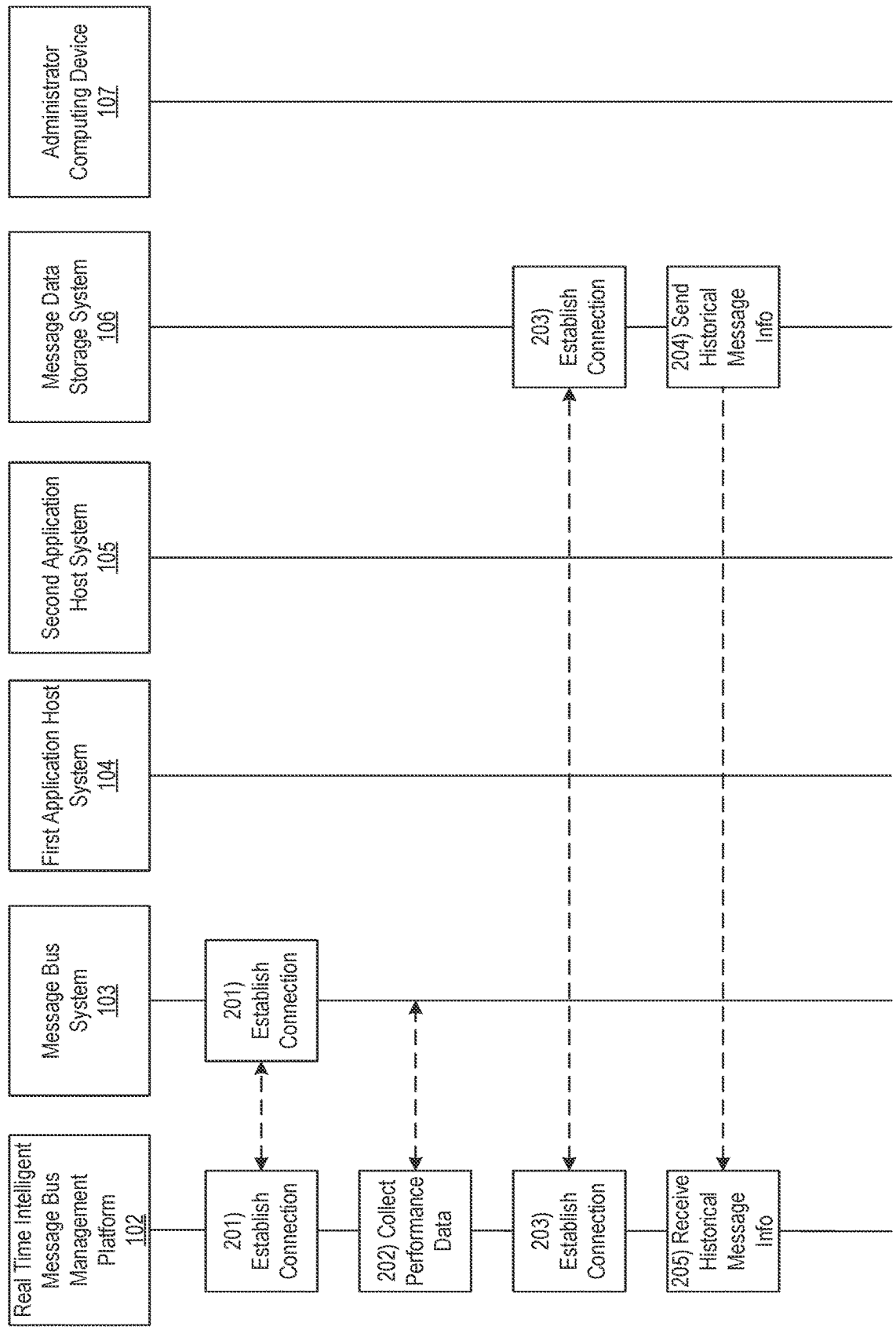

FIGS. 2A-2G depict an illustrative event sequence for improved message bus management in accordance with one or more example embodiments. Referring to FIG. 2A, at step 201, real time intelligent message bus management platform 102 may establish a connection with the message bus system 103. For example, the real time intelligent message bus management platform 102 may establish a first wireless data connection with the message bus system 103 to link the real time intelligent message bus management platform 102 to the message bus system 103 (e.g., in preparation for collecting performance information from the message bus system 103). In some instances, the real time intelligent message bus management platform 102 may identify whether a connection is already established with the message bus system 103. If a connection is already established with the message bus system 103, the real time intelligent message bus management platform 102 might not establish the connection. Otherwise, if a connection is not yet established with the message bus system 103, the real time intelligent message bus management platform 102 may establish the first wireless data connection as described herein.

At step 202, the real time intelligent message bus management platform 102 may monitor the message bus system 103 to collect performance data. For example, the real time intelligent message bus management platform 102 may identify throughput information, message processing delays, utilization information, redundancy information, processing capacity, and/or other information affecting message processing by the message bus system 103.

At step 203, the real time intelligent message bus management platform 102 may establish a connection with the message data storage system 106. For example, the real time intelligent message bus management platform 102 may establish a second wireless data connection to link the message data storage system 106 to the real time intelligent message bus management platform 102 (e.g., in preparation for sending historical message priority information). In some instances, the message data storage system 106 may identify whether a connection is already established with the real time intelligent message bus management platform 102.

If a connection is already established with the real time intelligent message bus management platform 102, the message data storage system 106 might not re-establish the connection. If a connection is not yet established with the real time intelligent message bus management platform 102, the message data storage system 106 may establish the second wireless data connection as described herein.

At step 204, the message data storage system 106 may send historical message priority information to the real time intelligent message bus management platform 102. For example, the message data storage system 106 may send historical messages and corresponding message priority scores, which may, e.g., be used to train a real time intelligent message bus management model at the real time intelligent message bus management platform 102. In some instances, the message data storage system 106 may send the historical message priority information to the real time intelligent message bus management platform 102 while the second wireless data connection is established.

At step 205, the real time intelligent message bus management platform 102 may receive the historical message priority information sent at step 204. For example, the real time intelligent message bus management platform 102 may receive the historical message priority information via the communication interface 113 and while the second wireless data connection is established.

Figure 2B:
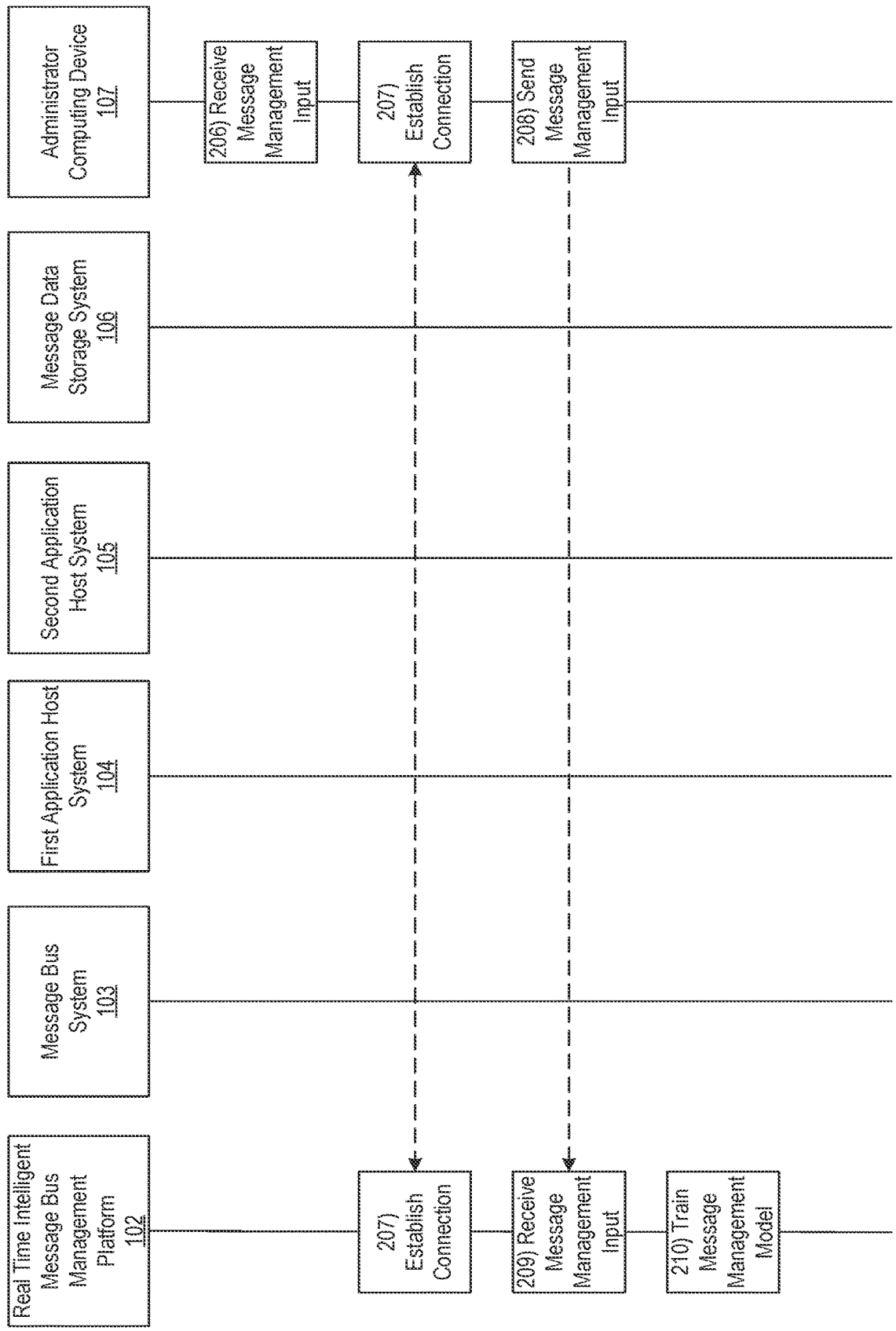

Referring to FIG. 2B, at step 206, the administrator computing device 107 may receive a message management input. For example, the administrator computing device 107 may receive information indicating priority of various historical messages (e.g., priority for message processing). Additionally or alternatively, the administrator computing device 107 may receive one or more rules that may define a real time intelligent message bus management model (e.g., the constraints, parameters, and/or other characteristics of the real time intelligent message bus management model may be manually defined).

At step 207, the administrator computing device 107 may establish a connection with the real time intelligent message bus management platform 102. For example, the administrator computing device 107 may establish a third wireless data connection with the real time intelligent message bus management platform 102 to link the administrator computing device 107 to the real time intelligent message bus management platform 102 (e.g., in preparation for sending message management information). In some instances, the administrator computing device 107 may identify whether a connection is already established with the real time intelligent message bus management platform 102. If a connection is already established with the real time intelligent message bus management platform 102, the administrator computing device 107 might not re-establish the connection. If a connection is not yet established with the real time intelligent message bus management platform 102, the administrator computing device 107 may establish the third wireless data connection as described herein.

At step 208, the administrator computing device 107 may send message management information (e.g., based on the message management input) to the real time intelligent message bus management platform 102. For example, the administrator computing device 107 may send the message management information to the real time intelligent message bus management platform 102 while the third wireless data connection is established.

At step 209, the real time intelligent message bus management platform 102 may receive the message management information sent at step 208. For example, the real time intelligent message bus management platform 102 may receive the message management information via the communication interface 113 and while the third wireless data connection is established.

At step 210, the real time intelligent message bus management platform 102 may train a real time intelligent message bus management model using the historical performance data (received at step 202), historical message priority information (received at step 205), and/or the message management information (received at step 209). For example, the real time intelligent message bus management platform 102 may train the real time intelligent message bus management model in a manual and/or automated manner. In doing so, the real time intelligent message bus management platform 102 may train the real time intelligent message bus management model using one or more supervised learning techniques. For example, the real time intelligent message bus management platform 102 may train the intelligent message bus management model using labelled data, which may, e.g., include historical messages with corresponding priority labels (e.g., low priority, medium priority, and/or high priority) and/or scores (e.g., scores from 1 to 10 where 1 indicates a lowest priority message and 10 indicates a highest priority message). Similarly, in this example, the real time intelligent message bus management platform 102 may train the intelligent message bus management model using labelled data indicating data priority threshold values and/or message processing threshold values and corresponding processing efficiency of the message bus system 103. In instances where one or more supervised learning techniques are used to train the real time intelligent message bus management model, the real time intelligent message bus management model may be and/or include techniques, algorithms, and/or models such as: neural networks, boosting, decision trees, nearest neighbor, support vector machines, random forests, and/or other supervised learning techniques. Additionally or alternatively, unsupervised learning may be used to train the real time intelligent message bus management model. For example, the real time intelligent message bus management platform 102 may train the intelligent message bus management model using unlabelled data, which may, e.g., include historical messages, message priority data, message bus performance information, and/or other information. In this example, the real time intelligent message bus management model may be and/or include techniques, algorithms, and/or models such as clustering, anomaly detection, and/or other unsupervised learning techniques. In either and/or both instances, the real time intelligent message bus management platform 102 may train the real time intelligent message bus management model to output, based on inputs such as message bus performance information and/or application messages, message priority scores, message priority thresholds, and/or message processing thresholds, the use of which is described further below. In some instances, the real time intelligent message bus management platform 102 may also train the real time intelligent message bus management model to output sub-scores/labels. For example, using similar techniques as those described with regard to outputting message priority scores, the real time intelligent message bus management platform 102 might output more refined message priority scores within these broader categories (e.g., a sub-score within the classification of "high priority," a more refined message priority score such as 9.5, and/or other scoring). In some instances, the real time intelligent message bus management platform 102 may train the intelligent message bus management model to output these sub-scores/labels based on identified flags, parameters, and/or other characteristics of the inputs (e.g., the real time intelligent message bus management model may be autodidactic). In some instances, the real time intelligent message bus management platform 102 may train the real time intelligent message bus management model on an application by application basis (e.g., each application may have its own corresponding thresholds, priority scoring information/techniques, and/or other parameters). For example, the real time intelligent message bus management platform 102 may train the real time intelligent message bus management model to output different message priority scores for similar messages from different applications.

Figure 2C:
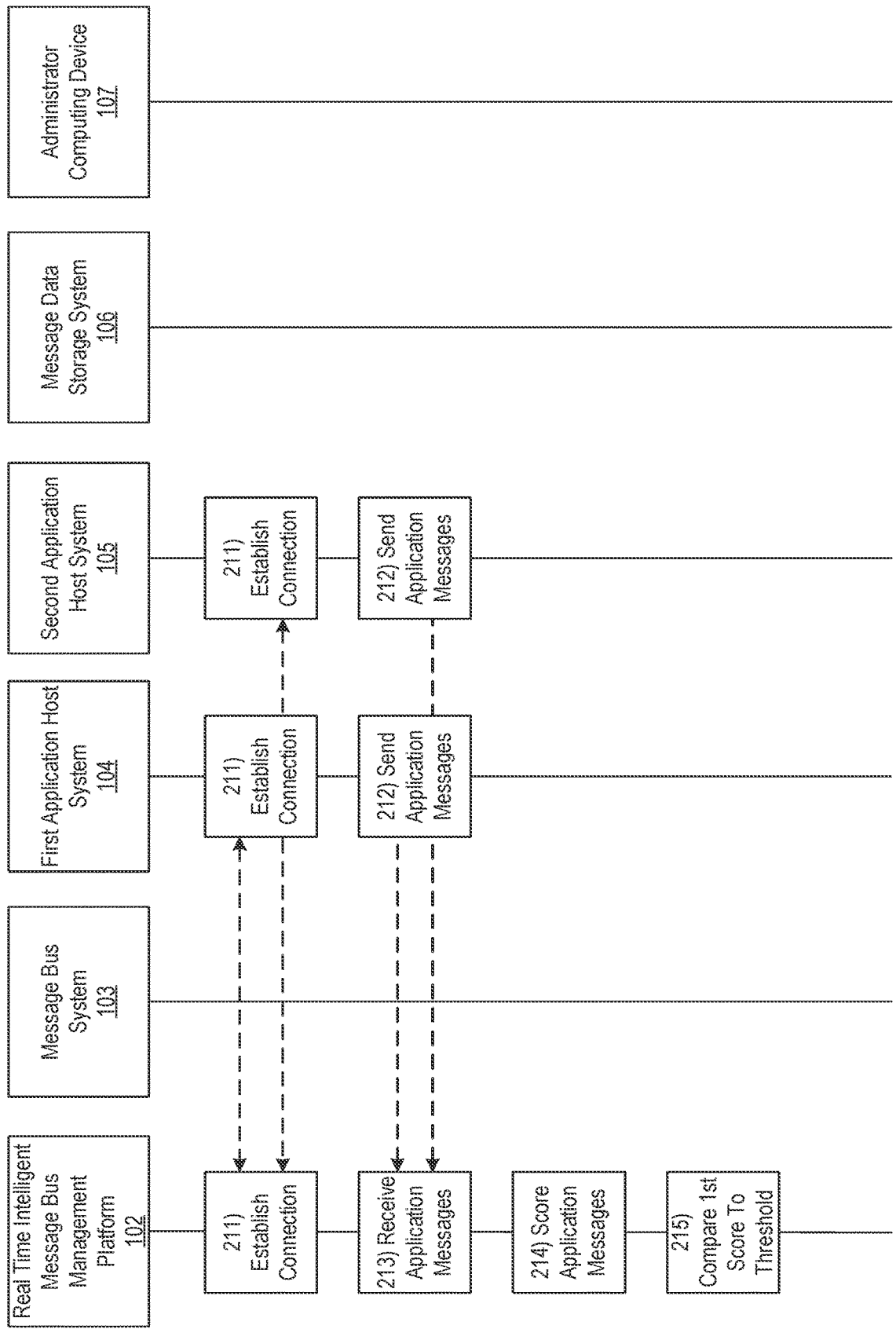

Referring to FIG. 2C, at step 211, the first application host system 104 and/or the second application host system 105 may establish connections with the real time intelligent message bus management platform 102. For example, the first application host system 104 and/or the second application host system 105 may establish fourth and fifth wireless data connections, respectively, with the real time intelligent message bus management platform 102 to link the first application host system 104 and/or the second application host system 105 with the real time intelligent message bus management platform 102 (e.g., in preparation for sending application messages). In some instances, the first application host system 104 and/or the second application host system 105 may identify whether connections are established with the real time intelligent message bus management platform 102. If connections are established with the real time intelligent message bus management platform 102, the first application host system 104 and/or the second application host system 105 might not re-establish the connections. If connections are not yet established with the real time intelligent message bus management platform 102, the first application host system 104 and/or the second application host system 105 may establish the fourth and/or fifth wireless data connections as described herein.

At step 212, the first application host system 104 and/or the second application host system 105 may send one or more application messages to the real time intelligent message bus management platform 102 (e.g., messages from trading applications, financial applications, and/or other applications). For example, the first application host system 104 and/or the second application host system 105 may send the one or more application messages while the fourth and/or fifth wireless data connection is established. In some instances, the first application host system 104 and/or the second application host system 105 may send application messages requesting execution of fund transfers, trades, offers to buy, offers to sell, and/or other requests related to financial products/services and/or other requests.

At step 213, the real time intelligent message bus management platform 102 may receive the one or more application messages sent at step 212. For example, the real time intelligent message bus management platform 102 may receive the one or more application messages via the communication interface 113 and while the fourth and/or fifth wireless data connections are established. In some instances, in receiving the one or more application messages, the real time intelligent message bus management platform 102 may intercept the one or more application messages sent from the first application host system 104 and/or second application host system 105 to the message bus system 103.

At step 214, the real time intelligent message bus management platform 102 may score the one or more application messages received at step 213. For example, the intelligent message bus management platform 102 may input a first application message and a second application message into the real time intelligent message bus management model, and then real time intelligent message bus management platform 102 may output a message priority score and/or priority label for each message. For example, using the real time intelligent message bus management model, which may be trained (as described above at step 210) to identify similarities between the one or more application messages and previously scored application messages (e.g., similarities in transaction details such as a transaction value, a transaction quantity, a transaction party, the corresponding application, and/or other information), so as to assign a priority score to these messages (which may, e.g., represent a priority in terms of processing the corresponding application message). In doing so, the real time intelligent message bus management platform 102 may output a first priority score for the first application message and a second priority score for the second application message. As a particular example, the real time intelligent message bus management platform 102 may output a first priority score of 10/priority label of "high" for the first application message, and a second priority score of 5/priority label of "medium" for the second application message. In some instances, the real time intelligent message bus management platform 102 may also output more refined message priority scores within these broader categories (e.g., a sub-score within the classification of "high priority," a more refined message priority score such as 9.5, and/or other scoring).

At step 215, the real time intelligent message bus management platform 102 may compare the first priority score/label to a message priority threshold. For example, the real time intelligent message bus management platform 102 may output, using the real time intelligent message bus management model, which may be trained as described above at step 210, a message priority threshold based on current performance of the message bus system 103. For example, the real time intelligent message bus management platform 102 may be constantly monitoring the message bus system 103 to collect performance data, which may then be input into the real time intelligent message bus model. The real time intelligent message bus model may then be configured to output, by comparing the performance data of the message bus system 103 to historical performance data and historical message priority thresholds, a message priority threshold. For example, the real time intelligent message bus model may be configured to output a message priority threshold based on processing capacity of the message bus system 103. As an example, the real time intelligent message bus model may output a message priority threshold of 7/10 or "medium." In these instances, the real time intelligent message bus management platform 102 may compare the first priority score/label to this threshold. In doing so, the real time intelligent message bus management platform 102 may identify that the first priority score/label exceeds the message priority threshold, and may thus proceed to step 216 accordingly.

Referring to FIG. 2D, at step 216, based on or in response to identifying that the first priority score meets or exceeds the message priority threshold, the real time intelligent message bus management platform 102 may route the first application message to the message bus system 103. In some instances, the real time intelligent message bus management platform 102 may also send one or more commands directing the message bus system 103 to process the first application message (e.g., execute a fund transfer, purchase, sale, trade, and/or other requested event). In some instances, the real time intelligent message bus management platform 102 may route the first application message to the message bus system 103 via the communication interface 113 and while the first wireless data connection is established.

At step 217, the message bus system 103 may receive the first application message sent at step 216. In some instances, the message bus system 103 may also receive one or more commands directing the message bus system 103 to process the first application message. In some instances, the message bus system 103 may receive the first application message while the first wireless data connection is established.

At step 218, based on or in response to the one or more commands directing the message bus system 103 to process the first application message, the message bus system 103 may add the first application message to a processing queue and/or process the first application message (e.g., execute a fund transfer, purchase, sale, trade, and/or other requested event). At step 219, the message bus system 103 may send a first message processing confirmation to the first application host system 104. For example, the message bus system 103 may send the first message processing confirmation directly to the first application host system 104, or the message bus system 103 may send the first message processing confirmation to the real time intelligent message bus management platform 102, which may route the first message processing confirmation to the first application host system 104 (e.g., the message bus system 103 may communicate with the first application host system 104 via the real time intelligent message bus management platform 102). In some instances, the message bus system 103 may also send one or more commands directing the first application host system 104 to display the first message processing confirmation.

At step 220, based on or in response to the one or more commands directing the first application host system 104 to display the first message processing confirmation, the first application host system 104 may display the first message processing confirmation. For example, the first application host system 104 may display a graphical user interface similar to graphical user interface 405, which is illustrated in FIG. 4.

Figure 2E:
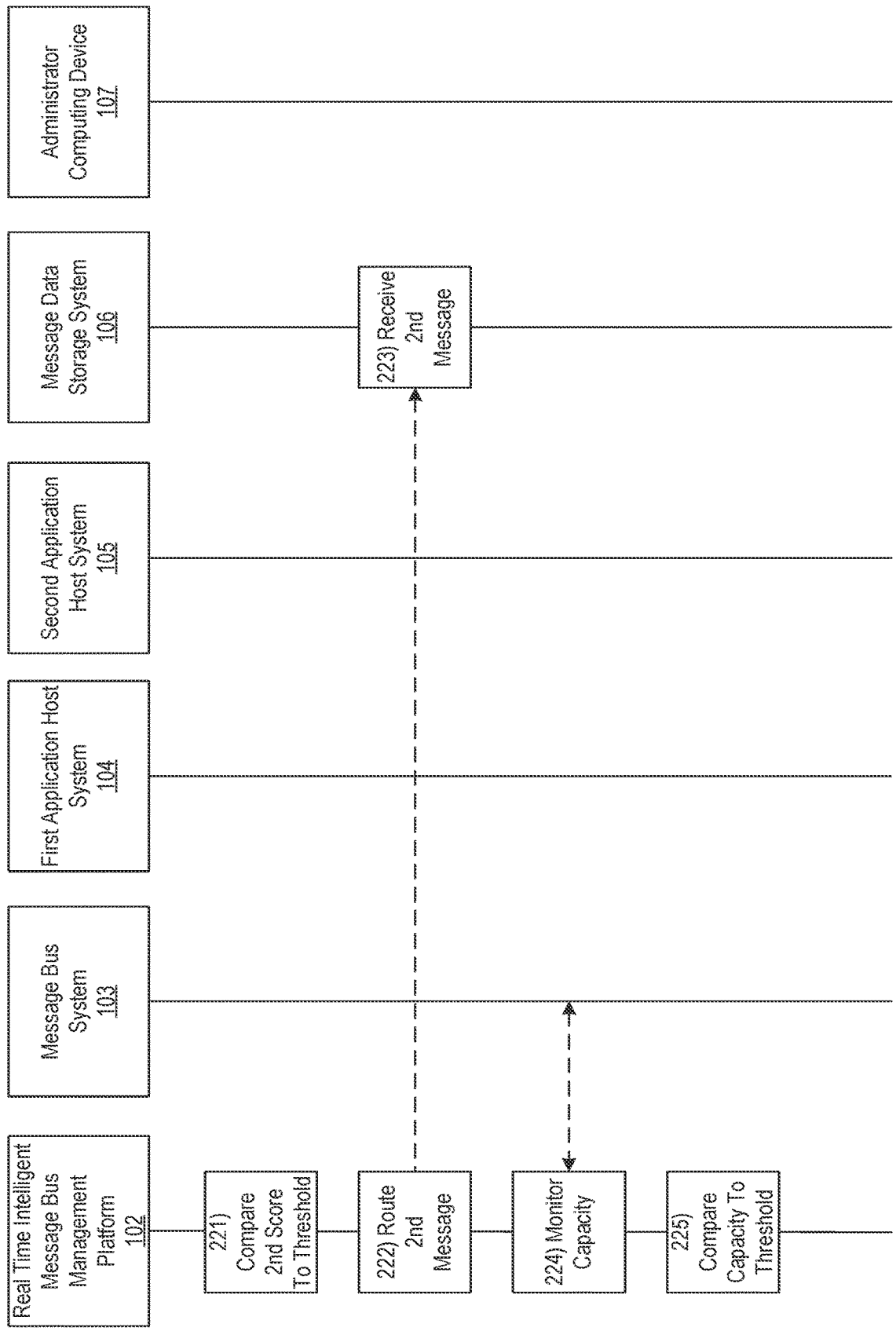

Referring to FIG. 2E, at step 221, the real time intelligent message bus management platform 102 may compare the second priority score to the priority threshold. For illustrative purposes, at step 221, the real time intelligent message bus management platform 102 may identify that the second priority score does not meet or exceed the message priority threshold. Based on this determination, the real time intelligent message bus management platform 102 may proceed to step 222.

At step 222, based on or in response to determining that the second priority score does not meet or exceed the message priority threshold, the real time intelligent message bus management platform 102 may route the second application message to the message data storage system 106. For example, the real time intelligent message bus management platform 102 may route the second application message to the real time intelligent message bus management platform 102 via the communication interface 113 and while the second wireless data connection is established.

At step 223, the message data storage system 106 may receive the second application message, sent at step 222. For example, the message data storage system 106 may receive the second application message while the second wireless data connection is established. In these instances, the message data storage system 106 may store the second application. In some instances, at step 223 and/or step 222, the real time intelligent message bus management platform 102 and/or the message data storage system 106 may send a message processing delay notification to the second application host system 105. In these instances, the real time intelligent message bus management platform 102 and/or the message data storage system 106 may also send one or more commands directing the second application host system 105 to display the message processing delay notification, which may, e.g., cause the second application host system 105 to display the message processing delay notification. For example, the second application host system 105 may display a graphical user interface similar to graphical user interface 505, which is shown in FIG. 5.

At step 224, the real time intelligent message bus management platform 102 may monitor processing capacity of the message bus system 103. For example, the real time intelligent message bus management platform 102 may identify throughput information, message processing delays, utilization information, redundancy information, processing capacity, and/or other information affecting message processing by the message bus system 103. In some instances, actions performed at step 224 may be similar to those performed at step 202.

At step 225, the real time intelligent message bus management platform 102 may compare one or more processing capacity metrics, collected at step 224, to a message processing threshold. For example, the real time intelligent message bus management platform 102 may compare one or more of throughput information, message processing delays, utilization information, redundancy information, processing capacity, and/or other information affecting message processing to the message processing threshold. In some instances, the message processing threshold may indicate a level at which the message bus system 103 may process application messages at a particular rate, within a period of time, with a particular efficiency, and/or otherwise indicate a level that differentiates when the message bus system 103 should accept versus not accept additional message for processing. In some instances, the real time intelligent message bus management platform 102 may identify that the message processing threshold is met or exceeded. In these instances, the real time intelligent message bus management platform 102 may proceed to step 226. In other instances, the real time intelligent message bus management platform 102 may identify that the message processing threshold is not met or exceeded. In these instances, the real time intelligent message bus management platform 102 may continue to monitor the message bus system 103 until the message processing threshold has been exceeded.

Figure 2F:
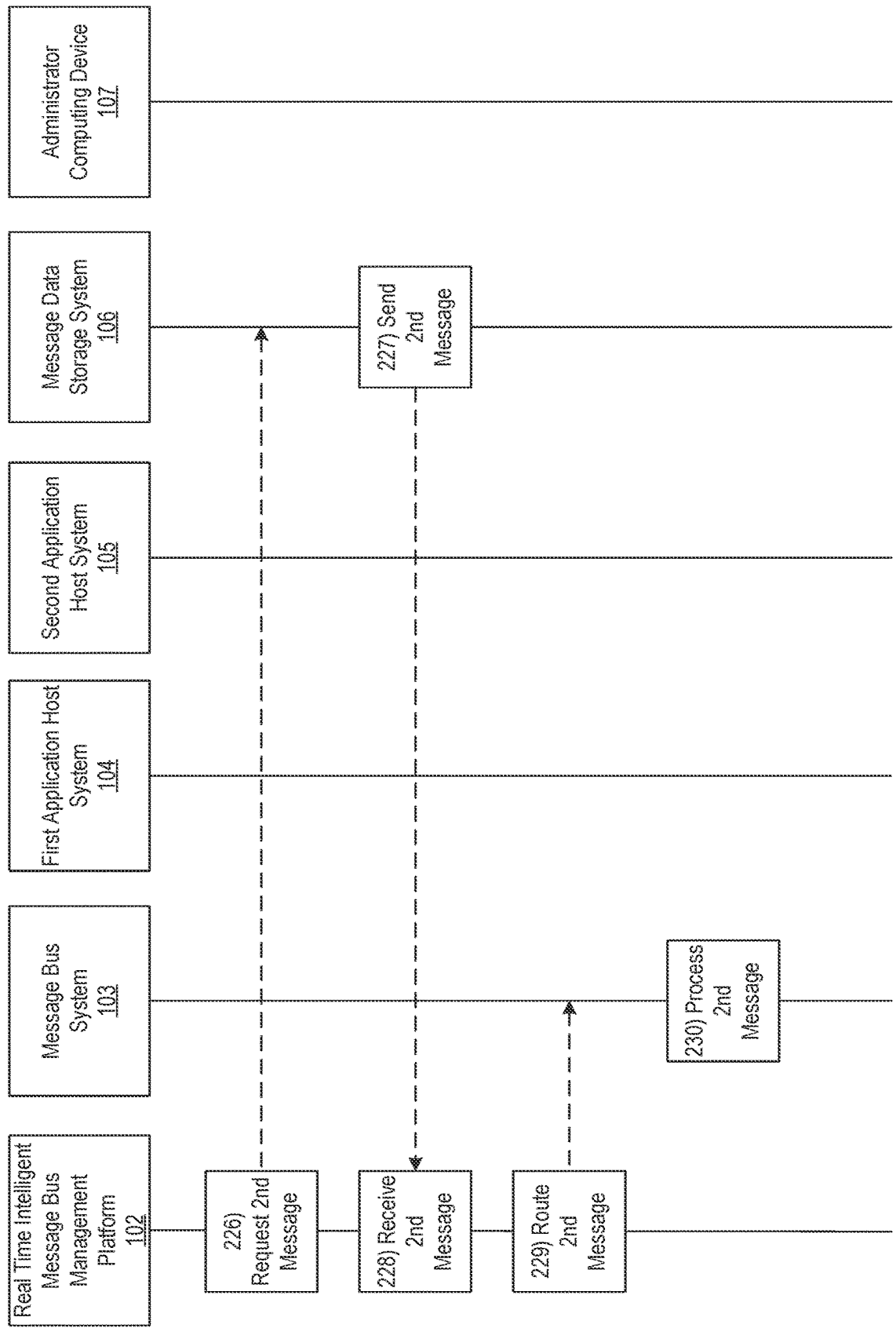

Referring to FIG. 2F, at step 226, based on or in response to determining that the message processing threshold has been exceeded the real time intelligent message bus management platform 102 may request the second application message from the message data storage system 106. For example, the real time intelligent message bus management platform 102 may request the second application message via the communication interface 113 and while the second wireless data connection is established.

At step 227, the message data storage system 106 may send the second application message to the real time intelligent message bus management platform 102. For example, the message data storage system 106 may send the second application message to the real time intelligent message bus management platform 102 while the second wireless data connection is established.

At step 228, the real time intelligent message bus management platform 102 may receive the second application message from the message data storage system 106. For example, the real time intelligent message bus management platform 102 may receive the second application message via the communication interface 113 and while the second wireless data connection is established.

At step 229, the real time intelligent message bus management platform 102 may route the second application message to the message bus system 103. For example, the real time intelligent message bus management platform 102 may send the second application message to the message bus system 103 via the communication interface 113 and while the first wireless data connection is established. In some instances, the real time intelligent message bus management platform 102 may also send one or more commands directing the message bus system 103 to process the second application message (e.g., execute a fund transfer, purchase, sale, trade, and/or other requested event).

At step 230, based on or in response to the one or more commands directing the message bus system 103 to process the second application message, the message bus system 103 may add the second application message to a processing queue and/or otherwise process the second application message.

Referring to FIG. 2G, at step 231, may send a second message processing confirmation to the second application host system 105. For example, the message bus system 103 may send the second message processing confirmation directly to the second application host system 105, or the message bus system 103 may send the second message processing confirmation to the real time intelligent message bus management platform 102, which may route the second message processing confirmation to the second application host system 105 (e.g., the message bus system 103 may communicate with the second application host system 105 via the real time intelligent message bus management platform 102). In some instances, the message bus system 103 may also send one or more commands directing the second application host system 105 to display the second message processing confirmation.

At step 232, based on or in response to the one or more commands directing the second application host system 105 to display the second message processing confirmation, the second application host system 105 may display the second message processing confirmation. For example, the second application host system 105 may display a graphical user interface similar to graphical user interface 405, which is illustrated in FIG. 4.

At step 233, the real time intelligent message bus management platform 102 may monitor the message bus system 103 to detect feedback information. For example, the real time intelligent message bus management platform 102 may identify processing delays at the message bus, throughput at the message bus, utilization at the message bus, redundancy at the message bus, a duration during which application messages are being routed to the message storage system, or a rate of changing message flow between the message bus and the message storage system, and/or other information affecting message processing by the message bus system 103, which may, in some instances, indicate that too many, too few, or an optimal amount or number of application messages are being processed by the message bus system 103 at a given time.

At step 234, the real time intelligent message bus management platform 102 may input the feedback information into the real time intelligent message bus management model to refine, reinforce, and/or otherwise update the real time intelligent message bus management model. For example, based on the feedback information, the real time intelligent message bus management platform 102 may update the message processing threshold, message priority threshold, and/or scoring algorithms so as to cause more, fewer, or the same amount or number of application messages to be routed to the message bus system 103 at a given time. For example, if the real time intelligent message bus management model 102 determines that fewer application messages should be sent to the message bus system 103 (e.g., to avoid processing delays), the message processing threshold and/or message priority threshold may be increased, and/or lower priority values may be assigned overall. In contrast, if the real time intelligent message bus management platform 102 determines that more application messages should be sent to the message bus system 103 (e.g., the message bus system 103 is capable of processing at higher capacity), the message processing threshold and/or message priority threshold may be decreased, and/or higher priority values may be assigned overall. In doing so, the real time intelligent message bus management platform 102 may dynamically refine the real time intelligent message bus management platform 102 based on feedback from the message bus system 103 to improve, dynamically, continuously, and in real time, overall processing of application messages by the message bus system 103.

By dynamically routing application messages to the message bus system 103 based on message priority, the real time intelligent message bus management platform 102 may prevent application lag, restarting of the message bus, and/or other errors resulting from insufficient memory or other processing capacity of the message bus system 103. Furthermore, rather than merely increasing the memory of the message bus system 103 to provide additional processing capacity, this method may be scalable regardless of an amount or number of application messages being sent (e.g., because messages will be optimally routed based on capacity of the message bus system 103 regardless of message volume). In some instances, this may also be a more cost effective solution than merely increasing memory of the message bus (e.g., because purchase of additional computing resources/memory may be avoided). Additionally, such a method may eliminate any downtime corresponding to message bus overload (e.g., because the flow of messages to the message bus system 103 may be managed, the message bus system 103 might not become overloaded, which may otherwise cause downtime). Accordingly, the methods and systems described herein may provide a technical solution that offers numerous technical benefits and addresses the problem of message bus processing constraints.

Figure 3:
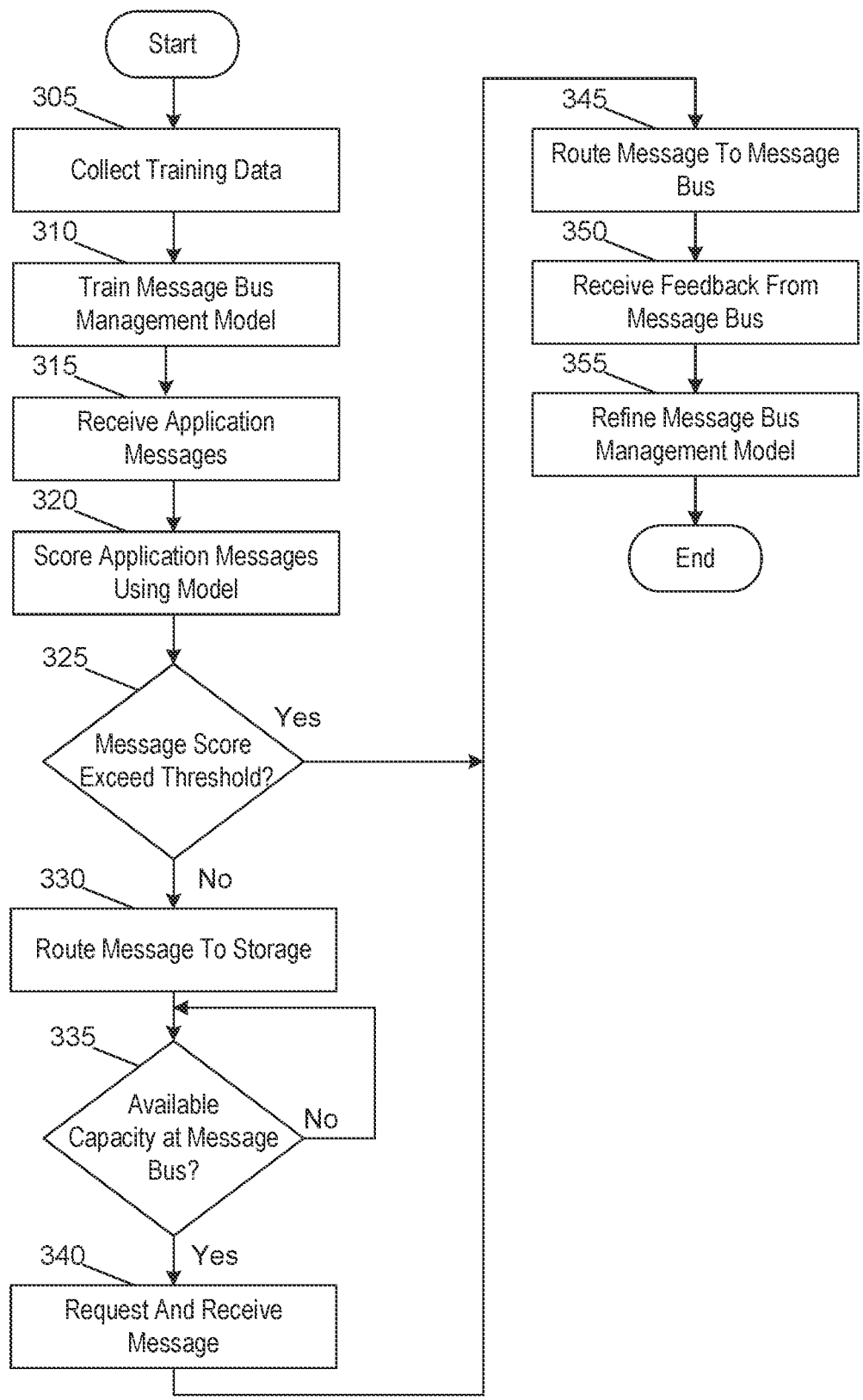
FIG. 3 depicts an illustrative method for improved message bus management in accordance with one or more example embodiments.

FIG. 3 depicts an illustrative method for improved message bus management in accordance with one or more example embodiments. Referring to FIG. 3, at step 305, a computing device having at least one processor, a communication interface, and memory may collect training data. At step 310, the computing platform may train a message bus management model using the training data. At step 315, the computing platform may receive one or more application messages. At step 320, the computing platform may score the one or more application messages using the message bus management model based on message priority. At step 325, the computing platform may compare the message priority scores to a priority threshold. For message priority scores that meet or exceed the priority threshold, the computing platform may proceed to step 345. For message priority scores that do not exceed the priority threshold, the computing platform may proceed to step 330.

At step 330, the computing platform may route application messages to storage. At step 335, the computing platform may monitor processing capacity at a message bus system. If available processing capacity is not detected, the computing platform may return to step 335. Otherwise, if available processing capacity is detected, the computing platform may proceed to step 340.

At step 340, the computing platform may request the application messages from the storage system. At step 345, the computing platform may route the application messages to the message bus system. At step 350, the computing platform may receive feedback information from the message bus system. At step 355, the computing platform may update the message bus management model based on the feedback.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
      intercept a first application message from an application host system, wherein the first application message is directed to a message bus for processing;
      input the first application message into a real time intelligent message bus management model, wherein the real time intelligent message bus management model is configured to output a first message priority score for the first application message;
      compare, using the real time intelligent message bus management model, the first message priority score to a message priority threshold;
      based on identifying that the first message priority score does not exceed the message priority threshold, route the first application message to a message storage system rather than the message bus;
      monitor the message bus to detect available processing capacity;
      based on identifying that the available processing capacity meets or exceeds a message processing threshold, route the first application message to the message bus;
      monitor the message bus to detect message processing feedback information; and
      update, using the message processing feedback information, the real time intelligent message bus management model.

2. The computing platform of claim 1, wherein the memory stores additional computer-readable instructions that, when executed by the at least one processor, further cause the computing platform to:
   train the real time intelligent message bus management model, wherein training the real time intelligent message bus management model comprises training, using a supervised learning process, a decision tree model.

3. The computing platform of claim 2, wherein training the real time intelligent message bus management model comprises automatically training the real time intelligent message bus management model based on: historical application messages, message priority scores corresponding to the historical application messages, and historical processing capacity of the message bus.

4. The computing platform of claim 1, wherein the memory stores additional computer-readable instructions that, when executed by the at least one processor, further cause the computing platform to:
  intercept a second application message from the application host system, wherein the second application message is directed to the message bus for processing;
  input the second application message into the real time intelligent message bus management model, wherein the real time intelligent message bus management model is configured to output a second message priority score for the second application message;
  compare, using the real time intelligent message bus management model, the first message priority score to the message priority threshold; and
  based on identifying that the second message priority score meets or exceeds the message priority threshold, route the second application message to the message bus.

5. The computing platform of claim 1, wherein detecting the available processing capacity comprises identifying one or more of: throughput, utilization, or redundancy of the message bus.

6. The computing platform of claim 1, wherein the memory stores additional computer-readable instructions that, when executed by the at least one processor, further cause the computing platform to:
  based on identifying that the available processing capacity does not exceed the message processing threshold, delay routing of the first application message to the message bus.

7. The computing platform of claim 1, wherein the memory stores additional computer-readable instructions that, when executed by the at least one processor, further cause the computing platform to:
  dynamically identify, using the real time intelligent message bus management model, the message priority threshold.

8. The computing platform of claim 1, wherein the message processing feedback information comprises one or more of: processing delays at the message bus, throughput at the message bus, utilization at the message bus, redundancy at the message bus, a duration during which application messages are being routed to the message storage system, or a rate of changing message flow between the message bus and the message storage system.

9. The computing platform of claim 1, wherein updating the real time intelligent message bus management model comprises updating one or more of: the message priority threshold or the message processing threshold.

10. The computing platform of claim 1, wherein application messages comprise requests to execute a transaction, and wherein the real time intelligent message bus management model is configured to score the application messages based on one or more of: a transaction value, a transaction quantity, or a transaction party.

11. A method comprising:
  at a computing device comprising at least one processor, a communication interface, and memory:
    intercepting a first application message from an application host system, wherein the first application message is directed to a message bus for processing;
    inputting the first application message into a real time intelligent message bus management model, wherein the real time intelligent message bus management model is configured to output a first message priority score for the first application message;
    comparing, using the real time intelligent message bus management model, the first message priority score to a message priority threshold;
    based on identifying that the first message priority score does not exceed the message priority threshold, routing the first application message to a message storage system rather than the message bus;
    monitoring the message bus to detect available processing capacity;
    based on identifying that the available processing capacity meets or exceeds a message processing threshold, routing the first application message to the message bus;
    monitoring the message bus to detect message processing feedback information; and
    updating, using the message processing feedback information, the real time intelligent message bus management model.

12. The method of claim 11, further comprising:
  training the real time intelligent message bus management model, wherein training the real time intelligent message bus management model comprises training, using a supervised learning process, a decision tree model.

13. The method of claim 12, wherein training the real time intelligent message bus management model comprises automatically training the real time intelligent message bus management model based on: historical application messages, message priority scores corresponding to the historical application messages, and historical processing capacity of the message bus.

14. The method of claim 11, further comprising:
  intercepting a second application message from the application host system, wherein the second application message is directed to the message bus for processing;
  inputting the second application message into the real time intelligent message bus management model, wherein the real time intelligent message bus management model is configured to output a second message priority score for the second application message;
  comparing, using the real time intelligent message bus management model, the first message priority score to the message priority threshold; and
  based on identifying that the second message priority score meets or exceeds the message priority threshold, routing the second application message to the message bus.

15. The method of claim 11, wherein detecting the available processing capacity comprises identifying one or more of: throughput, utilization, or redundancy of the message bus.

16. The method of claim 11, further comprising:
  based on identifying that the available processing capacity does not exceed the message processing threshold, delaying routing of the first application message to the message bus.

17. The method of claim 11, further comprising:
  dynamically identifying, using the real time intelligent message bus management model, the message priority threshold.

18. The method of claim 11, wherein the message processing feedback information comprises one or more of: processing delays at the message bus, throughput at the message bus, utilization at the message bus, redundancy at the message bus, a duration during which application messages are being routed to the message storage system, or a rate of changing message flow between the message bus and the message storage system.

19. The method of claim 11, wherein updating the real time intelligent message bus management model comprises updating one or more of: the message priority threshold or the message processing threshold.

20. One or more non-transitory computer-readable media storing instructions that, when executed by a computing device comprising at least one processor, a communication interface, and memory, cause the computing device to:

intercept a first application message from an application host system, wherein the first application message is directed to a message bus for processing;

input the first application message into a real time intelligent message bus management model, wherein the real time intelligent message bus management model is configured to output a first message priority score for the first application message;

compare, using the real time intelligent message bus management model, the first message priority score to a message priority threshold;

based on identifying that the first message priority score does not exceed the message priority threshold, route the first application message to a message storage system rather than the message bus;

monitor the message bus to detect available processing capacity;

based on identifying that the available processing capacity meets or exceeds a message processing threshold, route the first application message to the message bus;

monitor the message bus to detect message processing feedback information; and update, using the message processing feedback information, the real time intelligent message bus management model.

\* \* \* \* \*